(12) United States Patent
Schulz

(10) Patent No.: US 6,640,322 B1
(45) Date of Patent: Oct. 28, 2003

(54) INTEGRATED CIRCUIT HAVING DISTRIBUTED CONTROL AND STATUS REGISTERS AND ASSOCIATED SIGNAL ROUTING MEANS

(75) Inventor: Jurgen M. Schulz, Pleasanton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/532,383

(22) Filed: Mar. 22, 2000

(51) Int. Cl.⁷ .............................................. G01R 31/28
(52) U.S. Cl. ...................................... 714/724; 714/730
(58) Field of Search ................................. 714/724, 730

(56) References Cited

U.S. PATENT DOCUMENTS

| | | | | |
|---|---|---|---|---|
| 4,701,921 A | * | 10/1987 | Powell et al. ................. | 714/727 |
| 4,918,379 A | * | 4/1990 | Jongepier ................... | 324/73.1 |
| 5,477,548 A | * | 12/1995 | Beenker et al. ............. | 714/727 |
| 5,577,052 A | * | 11/1996 | Morris ........................ | 714/733 |
| 5,983,301 A | | 11/1999 | Baker et al. ................. | 710/113 |
| 6,065,078 A | * | 5/2000 | Falik et al. .................. | 710/100 |
| RE36,839 E | | 8/2000 | Simmons et al. ............. | 326/93 |
| 6,115,763 A | * | 9/2000 | Douskey et al. ............. | 710/72 |
| 6,202,163 B1 | | 3/2001 | Gabzdyl et al. ............. | 713/324 |
| 6,202,166 B1 | | 3/2001 | Tang ........................... | 713/500 |
| 6,205,192 B1 | | 3/2001 | Igura ........................... | 375/354 |
| 6,232,820 B1 | | 5/2001 | Long et al. .................. | 327/374 |
| 6,247,134 B1 | | 6/2001 | Sproch et al. ............... | 713/320 |
| 6,275,081 B1 | | 8/2001 | Flake ........................... | 327/202 |
| 6,308,313 B1 | | 10/2001 | Lakshminarayana et al. . | 716/18 |
| 6,311,302 B1 | * | 10/2001 | Cassetti et al. ............. | 714/727 |
| 6,324,662 B1 | * | 11/2001 | Haroun et al. .............. | 714/724 |
| 6,334,198 B1 | * | 12/2001 | Adusumilli et al. ......... | 714/727 |
| 6,363,501 B1 | * | 3/2002 | Tobias et al. ................. | 714/30 |
| 6,408,413 B1 | * | 6/2002 | Whetsel ........................ | 714/727 |
| 6,425,100 B1 | * | 7/2002 | Bhattacharya ............... | 714/724 |

FOREIGN PATENT DOCUMENTS

EP 786 727 7/1997

OTHER PUBLICATIONS

Avra, "A VHSIC ETM–BUS—Compatible Test and Maintenance Interface", 1987 International Test Conference, pp. 964–971.*
"The CoreConnect™ Bus Architecture," International Business Machines Corp., XP–002204519, 1999, pp. 1–9.
"Figure Fight," Nick Flaherty, Electronics Times, Jul. 16, 20014 pages.
International Search Report for PCT/US 01/07911, mailed Jul. 22, 2002.

* cited by examiner

Primary Examiner—Stephen M. Baker
(74) Attorney, Agent, or Firm—Meyertons, Hood, Kivlin, Kowert & Goetzel, P.C.; B Noël Kivlin

(57) ABSTRACT

An integrated circuit is presented having a plurality of logic modules dispersed about a surface of a semiconductor substrate. Each logic module includes a set of control and status registers including at least one control register storing a control value. A functional unit of each logic module performs one or more logic functions dependent upon the control value stored in the control register. A central controller is coupled to the each of the logic modules. The central controller is adapted to receive address, data, and control signals (e.g., from signal lines of an external bus coupled to I/O pads of the integrated circuit), and issues read/write commands to read/write the control and status registers dependent upon the address, data, and control signals. A write command may, for example, modify the control value stored in a selected one of the control registers. The integrated circuit may include a bus which couples the central controller to each of the logic modules. The bus may, for example, couple the central controller and each of the logic modules in series forming a communication ring. In this case, the central controller and the logic modules represent separate modules along the communication ring which communicate by exchanging data via the communication ring. The data may travel in a single direction around the communication ring. The central controller and the logic modules may communicate according to an established set of communication rules.

25 Claims, 3 Drawing Sheets

INTEGRATED CIRCUIT HAVING DISTRIBUTED CONTROL AND STATUS REGISTERS AND ASSOCIATED SIGNAL ROUTING MEANS

BACKGROUND OF THE INVENTION

1. Field of the Invention

This invention relates to integrated circuits, and more particularly to integrated circuits including control and status registers.

2. Description of the Related Art

A typical computer system includes a central processing unit (CPU) coupled to one or more peripheral devices (e.g., disk drives and printers). The CPU typically monitors and controls the peripheral devices via addressable control and status registers (CSRs) within the devices. For example, in order to determine the state of a peripheral device, the CPU may read a status value from an address of a status register within the device. In order to configure or control functions of the device, the CPU may write a control value to an address assigned to a control register within the device. It is noted that the CPU itself may include CSRs, and may be monitored and controlled via the CSRs.

The CSRs of a device are typically formed with other device logic upon a single integrated circuit (IC). As IC fabrication technology has improved, the ability to integrate more and more functions onto single silicon substrates has increased. As a result, the number of functions performed by devices has also increased. In turn, the number of CSRs within the devices has necessarily increased. In fact, some devices now include hundreds of CSRs. It is also noted that shrinking IC device geometries have also allowed operating speeds of devices to increase.

FIG. 1 is a diagram of a representative integrated circuit (IC) 10 forming a device and including a centralized control and status register (CSR) block 12. CSR block 12 includes a set of addressable CSRs 16 assigned to the device. CSR block 12 is coupled to a set of input/output (I/O) pads 14 and to each of five functional units, numbered 1 through 5, dispersed about a surface of a semiconductor substrate 15. Each of the five functional units performs one or more logical functions dependent upon control values stored in control registers of CSR block 12. I/O pads 14 are adapted to receive address, data, and control signals from, for example, signal lines of an external bus coupled to I/O pads 14. When a write command conveyed via the address, data, and control signals includes an address of one of the CSRs 16, CSR block 12 stores the data within the addressed CSR. When a read command conveyed via the address, data, and control signals includes an address of one of the CSRs 16, CSR block 12 drives a data portion of I/O pads 14 with data stored within the addressed CSR.

CSR block 12 distributes control signals stored within control registers of the CSRs 16 to the five functional units via some signal lines of the multiple buses 18, and receives status information to be stored in the status registers of CSRs 16 via other signal lines of the multiple buses 18. As each bus 18 may have hundreds of signal lines, the routing of the signals lines of the multiple buses 18 across the substrate becomes a problem when IC 10 has a relatively large number of functional units. In addition, where IC 10 operates at high speeds (i.e., high clock frequencies), the fact that signals driven upon the signal lines of the multiple buses 18 in unison may not reach their destinations simultaneously creates signal timing problems.

It would thus be desirable to position CSRs of an integrated circuit and to route signals to the CSRs in a manner which reduces the signal routing and timing problems typical of current integrated circuits.

SUMMARY OF THE INVENTION

An integrated circuit is presented having a plurality of logic modules dispersed about a surface of a semiconductor substrate. Each logic module includes a set of control and status registers including at least one control register storing a control value. A functional unit of each logic module performs one or more logic functions dependent upon the control value stored in the control register. A central controller is coupled to each of the logic modules. The central controller is adapted to receive address, data, and control signals (e.g., from signal lines of an external bus coupled to I/O pads of the integrated circuit), and issues read and write commands to the control and status registers dependent upon the address, data, and control signals. A write command may, for example, modify the control value stored in a selected one of the control registers.

The functional unit of each logic unit may generate a status value during operation, wherein the status value reflects a status of the functional unit. A status register of the corresponding set of control and status registers may store the status value. The central controller may issue a read command to obtain the status value stored in a selected one of the status registers, and may drive the I/O pads of the integrated circuit with the status value.

The integrated circuit may include a bus which couples the central controller to each of the logic modules. The bus may, for example, couple the central controller and each of the logic modules in series forming a communication ring. In this case, the central controller and the logic modules represent separate modules along the communication ring which communicate by exchanging data via the communication ring. The data may travel in a single direction around the communication ring. The central controller and the logic modules may communicate according to an established set of communication rules.

The central controller and the logic modules may exchange packetized data. A given packet may include an address payload and/or a data payload. The address payload may include packet type (e.g., command) information. The address payload may also include a module identification value which uniquely identifies the module to which the packet is directed. The address payload may also include information which identifies a control or status register to which a command is directed. For example, the address payload of a packet may include information identifying the packet as conveying a write command, may include information identifying the module to which the packet is directed, and may also include information identifying the control register to which the write command is directed. The data payload may include read data or write data. Packets may also include error checking information such as a cyclic redundancy check (CRC) value.

Each logic module may also include a distributed controller coupled to the control and status registers. The distributed controller may receive commands and access control or status registers in response to the commands. The central controller may be coupled to the distributed controller of each of the logic modules via the above described bus. The central controller may issue the read and write commands to the distributed controllers, and the distributed controllers may carry out the read and write commands. For example, in response to a write command received from the central controller and directed to a control register, a distributed controller may modify a control value stored in the control register.

The central controller may also manage error logging and reporting for the distributed control and status registers. An error packet transmitted by a module detecting an error may have a data payload including a time stamp. The time stamp may be, for example, the value of a free running counter within the distributed controller of the reporting module when the error was detected. The free running counter value within error packets allows the central controller to determine which module detected an error first. Such information may help to determine where a fault exists.

BRIEF DESCRIPTION OF THE DRAWINGS

Other objects and advantages of the invention will become apparent upon reading the following detailed description and upon reference to the accompanying drawings in which.

Figure 1:
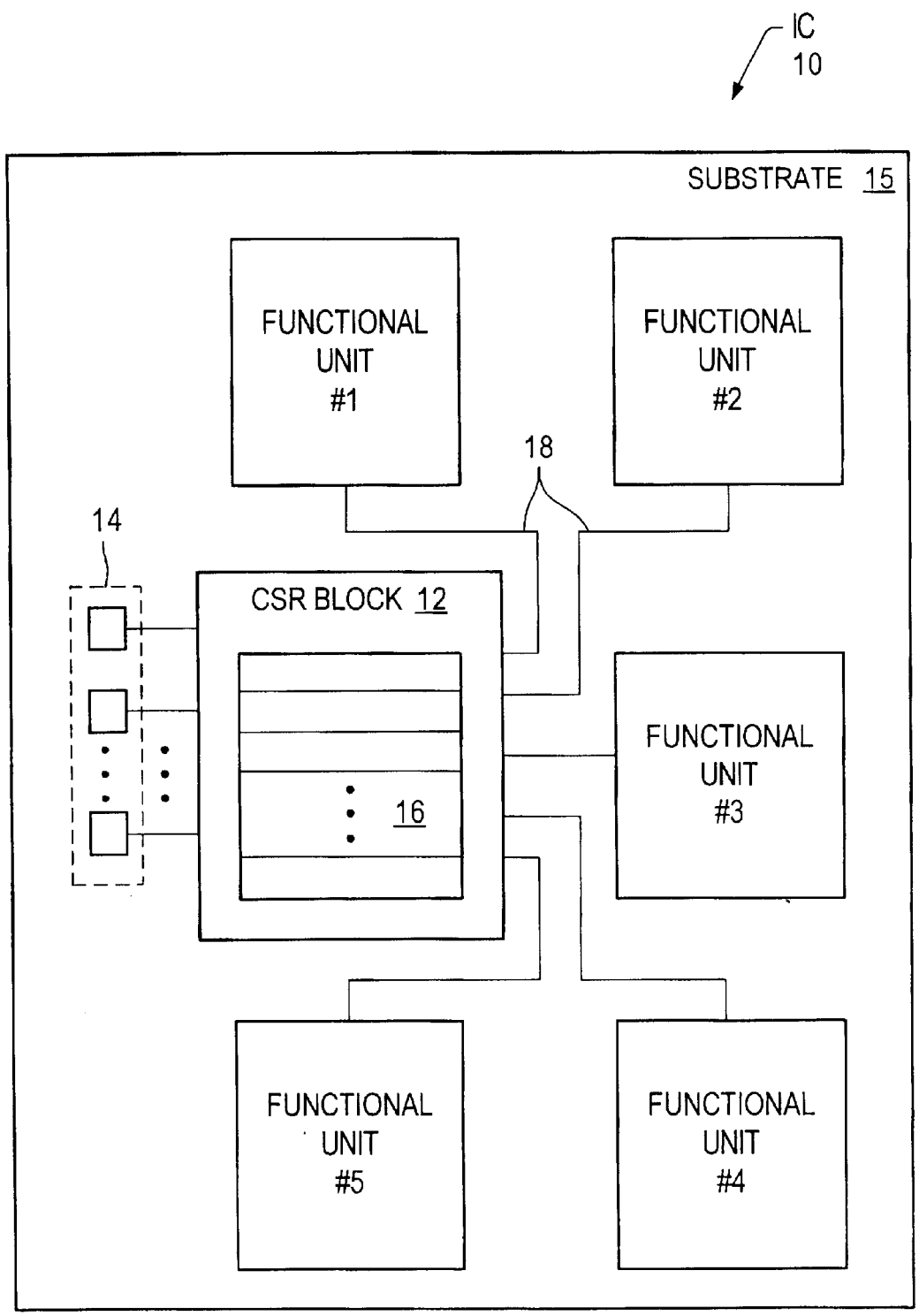
FIG. 1 is a diagram of a representative integrated circuit (IC) forming a device and including a centralized CSR block including multiple control and status registers (CSRs) assigned to the device.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
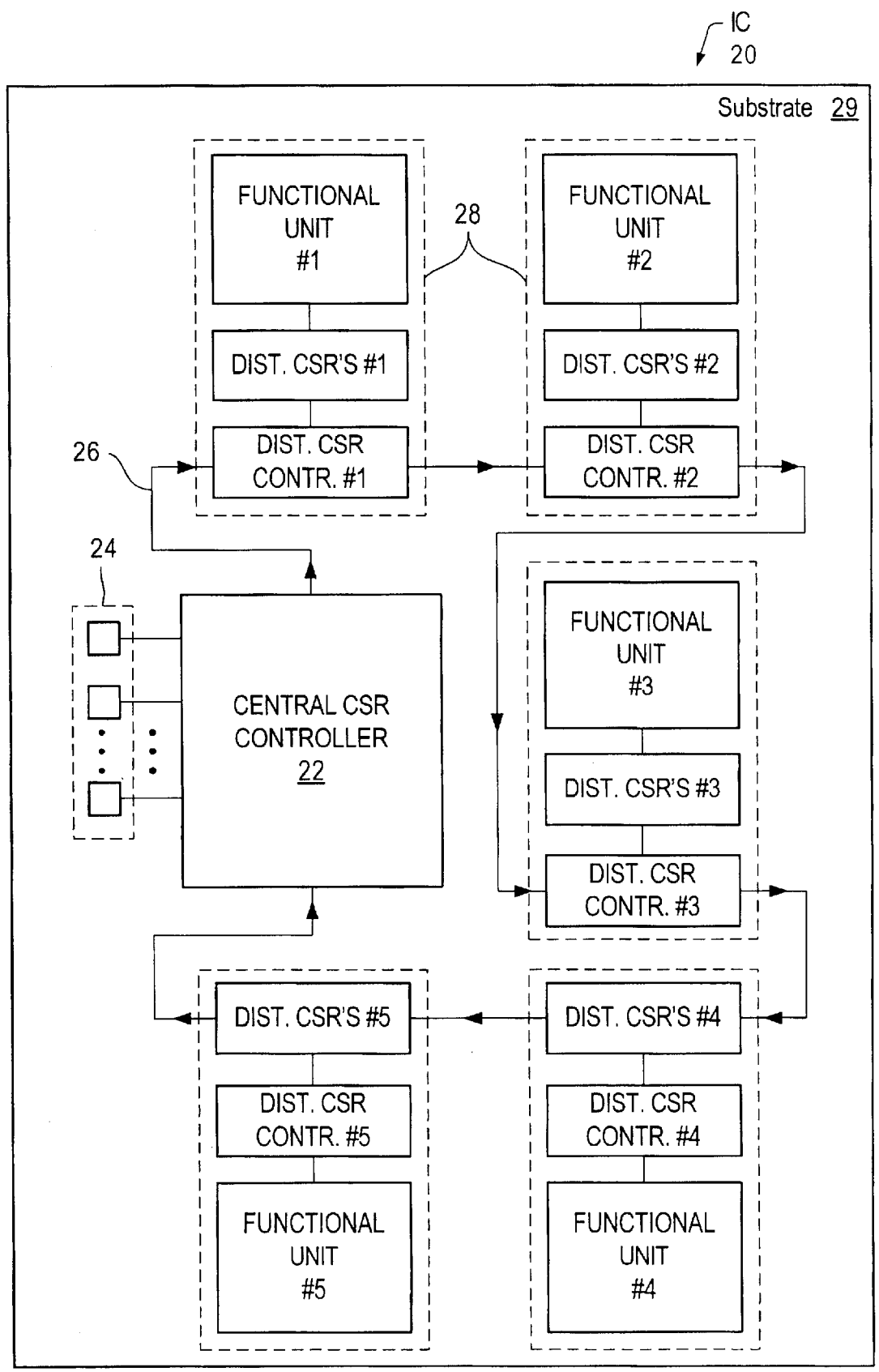
FIG. 2 is a diagram of one embodiment of an IC including multiple logic modules dispersed about a surface of a semiconductor substrate, wherein each logic module includes a set of control and status registers accessed by a distributed CSR controller, and wherein each distributed CSR controller is coupled to a central CSR controller.

FIG. 2 is a diagram of one embodiment of an integrated circuit (IC) 20. IC 20 may function within a computer system as a peripheral device controller, or as part of a peripheral device controller. IC 20 includes a central control and status register (CSR) controller 22 coupled to a set of input/output (I/O) pads 24. A single CSR bus 26 couples central CSR controller 22 and multiple logic modules 28 dispersed about a surface of a semiconductor substrate 29 in serial "daisy chain" fashion to form a communication ring. Each logic module 28 includes a set of distributed CSRs coupled between a distributed CSR controller and a functional unit. In the embodiment of FIG. 2, each set of distributed CSRs includes at least one control register, and may include one or more status registers. The functional unit performs one or more logical functions dependent upon a control value stored within the control register.

In contrast to the centralized set of CSRs in IC 10 of FIG. 1, the single CSR bus 26 of IC 20 (FIG. 2) significantly reduces control and status signal routing problems. Closely coupled to corresponding functional units, the CSRs of IC 20 are distributed about the surface of the substrate. The lengths of electrical conductors conveying signals between a given functional unit and the corresponding set of CSRs are much shorter than those of IC 10, reducing signal timing problems.

In the embodiment of FIG. 2, CSR bus 26 couples central CSR controller 22 and five logic modules 28 in serial "daisy chain" fashion to form a communication ring. Central CSR controller 22 and logic modules 28 form separate nodes or modules of the communication ring, and data flows in a single direction around the communication ring as indicated in FIG. 2. CSR bus 26 includes multiple sections, each section forming a point-to-point connection between an output port of one module and an input port of another module. Each module receives data from a predecessor or "upstream" module via one section of CSR bus 26 and sends data to a successor or "downstream" module via another section of CSR bus 26.

Each of the five logic modules 28 includes a set of distributed CSRs, labeled "DISTR. CSR #n" where n is an integer between 1 and 5, coupled between a distributed CSR controller labeled "DISTR. CSR CONTR. #n" and a functional unit labeled "FUNCTIONAL UNIT #n." Input and output ports of a distributed CSR controller form the input and output ports of the corresponding logic module 28. Data from the upstream module arrives at the input port of the distributed CSR controller, and the distributed CSR controller sends data to the downstream module by driving the data on CSR bus 26 at the output port.

CSR bus 26 may be a serial data bus upon which signals representing single binary digits (bits) of information are transmitted sequentially. Alternately, CSR bus may be a parallel data bus upon which multiple bits are transmitted simultaneously. In one embodiment, CSR bus 26 is a parallel data bus upon which eight bits are transmitted simultaneously at a clock frequency generated for the functional units of IC 20.

I/O pads 24 may be coupled to terminals of a device package, and are adapted to receive address, data, and control signals (e.g., from signals lines of an external bus coupled to I/O pads 24). When I/O pads 24 are coupled to corresponding signal lines of an external bus, central CSR controller 22 receives address, data, and control signals from the corresponding signals lines of the external bus, and drives address, data, and control signals upon the corresponding signal lines of the external bus. Central CSR controller 22 thus forms an interface between IC 20 and the external bus. It is noted that central CSR controller 22 may be accessed through various specific interfaces, such as a Joint Test Action Group (JTAG) interface.

When received address, data, and control signals convey a write command including an address of one of the addressable CSRs of IC 20, central CSR controller 22 issues a write command to a "target" logic module 28 including the addressed CSR via CSR bus 26. The write command includes address signals indicating the target logic module 28 and the addressed CSR, data signals conveying the data to be written into the addressed CSR, and a write command signal. The distributed CSR controller of the target logic module 28 writes the data conveyed by the write command into to the addressed CSR.

When received address, data, and control signals convey a read command including an address of one of the addressable CSRs of IC 20, central CSR controller 22 issues a read command to a target logic module 28 including the addressed CSR via CSR bus 26. The read command includes address signals indicating the target logic module 28 and the addressed CSR, and a read command signal. The distributed CSR controller of the target logic module 28 responds to the read command by reading the data within the addressed CSR and providing the data to the central CSR controller 22. Central controller 22 may then drive a data portion of I/O pads 24 with data retrieved from the addressed CSR.

Central CSR controller 22 preferably issues write and read commands as packets. As described below, central CSR controller 22 and logic modules 28 may also issue other types of packets. In one embodiment, the packets have a fixed length equal to the maximum CSR width divided by the width of CSR bus 26, and CSR bus 26 operates on a packet time-slot basis.

Each packet includes an address payload, a data payload, and a cyclic redundancy check (CRC) payload for error checking. The address payload conveys information identifying the type of packet, the target module, and the addressed CSR. The data payload conveys CSR data. In one embodiment, the maximum width of a CSR is 64 bits, the width of CSR bus 26 is 8 bits, and the packet data payload is conveyed in 8 cycles of CSR bus 26.

Central CSR controller 22 and each logic module 28 have different module identification (ID) values. A module ID value may be, for example, a number which uniquely identifies a given module. The address payload of a packet includes the module ID of the target module.

When a given module receives a packet, the distributed CSR controller examines the address payload of the packet to determine if the address payload includes the module ID of the module. If the address payload does include the module ID of the receiving module, the packet is not destined for the module, and the distributed CSR controller forwards the packet to the downstream module.

If the address payload includes the module ID of the receiving module, the packet is destined for the module. The distributed CSR controller copies the packet information and forwards the packet to the downstream module. The distributed CSR controller may modify the packet information before forwarding the packet to signal receipt of the packet. The distributed CSR controller performs the command according to the packet type information of the address payload. If the packet conveys a read command, the distributed CSR controller retrieves the data from addressed CSR and sends the data to central CSR controller 22 via the downstream module. In order to aid recognition of the read data by central CSR controller 22, the distributed CSR controller may include the module ID and address information from the original read command packet in the response packet including the read data. The distributed CSR controller may include packet type information which indicates the packet contains read data, append the read data, calculate a CRC value over the address and data payloads, and include the CRC value before sending the response packet including the read data.

Central CSR controller 22 checks the address and data payloads of all received packets for errors using the CRC values, and manages CSR error logging and reporting. When a packet returns to a sending module, the sending module removes the packet from the communication ring. The sending module may also check the address and data payloads for errors using the CRC value to make sure the packet completed the round trip without any errors before removing the packet from the communication ring. If the CRC check indicates an error, the sending module may send a packet to central CSR controller 22 indicating the error. (See table 3 below.) It is noted that selected modules may also check all received packets for errors and report any detected errors to central CSR controller 22. Further, all modules may check all received packets for errors and report any detected errors to central CSR controller 22.

Table 1 below illustrates an exemplary packet format where CSR bus 26 is a parallel data bus conveying eight bits of data as CSR[7-0] simultaneously.

TABLE 1

Exemplary Packet Format For 8-Bit CSR Bus.

| Packet Payload | Portion | CSR[7-0] |
|---|---|---|
| Address | AddrC | COM[7-0] |
|  | AddrM | MOD_D[m-(m-7)] |
|  | AddrA | ADDR[m-(m-7)] |
| Data |  | DATA[m-(m-7)] |
| CRC |  | CRC[7-0] |

In Table 1 above, the address payload is made up of a command portion (AddrC), a module ID portion (AddrM), and an address portion (AddrA). The 8-bit command (COM) portion conveys a command or packet type, such as a read command or a write command. The module ID (MOD_ID) portion includes the module ID of the target module. The address (ADDR) portion indicates the addressed CSR. The data (DATA) payload normally conveys data read from or written to a CSR. The module ID and address portions of the address payload, and the data payload, may include any number of bits, and thus may require any number of cycles of CSR bus 26. The 8-bit CRC value may be computed over the address and data payloads.

For example, Table 2 below lists the information conveyed upon CSR bus 26 during bus cycles where the module ID is 8 bits long, allowing for up to 256 modules, the address portion is 16 bits, the maximum width of a CSR is 64 bits, and higher-ordered bits are transmitted first.

TABLE 2

Exemplary Bus Cycle Information.

| Bus Cycle | Information Conveyed |
|---|---|
| 1 | COM[7:0] |
| 2 | MOD_ID[7:0] |
| 3 | ADDR[15:8] |
| 4 | ADDR[7:0] |
| 5 | DATA[63:56] |
| 6 | DATA[55:48] |
| 7 | DATA[47:40] |
| 8 | DATA[39:321 |
| 9 | DATA[31:24] |
| 10 | DATA[23:16] |
| 11 | DATA[15:8] |
| 12 | DATA[7:0] |
| 13 | CRC[7:0] |

In Table 2 above, the 8-bit command (AddrC) portion of the address payload is conveyed during the first cycle of CSR bus 26, and the 8-bit module ID (AddrM) portion of the address payload is conveyed during the second cycle. The 16-bit address (AddrA) portion of the address payload is conveyed during the third and fourth cycles of CSR bus 26. The 64-bit data payload is conveyed during bus cycles 5–12, and the 8-bit CRC value is conveyed during bus cycle 13.

Following reset, CSR bus 26 may be driven with all zeros (e.g., '00000000'). A distributed CSR controller may recognize a non-zero value driven upon CSR bus 26 as the start of a first packet.

Table 3 below lists exemplary contents of the command (AddrC) portion of the address payload.

TABLE 3

Exemplary Contents Of The Command (AddrC) Portion Of The Address Payload.

| COM[7:0] | Description |
|---|---|
| 11111111 | CSR bus 26 is free; a distributed CSR controller may insert a packet (e.g., on a packet time slot). |
| 00000001 | CSR write cycle; data will be written to the addressed CSR. The data payload contains the data to be written. |
| 00000010 | CSR read cycle; data will be read from the addressed CSR. (The data payload may, for example, contain all zeros). |
| 00000011 | CSR read cycle; data supplied by distributed CSR controller. |
| 00000100 | Distributed CSR error detected; the data payload contains time stamp. |
| (All Others) | Reserved. |

Central CSR controller 22 may send a write command packet on every packet timeslot. In one embodiment, central CSR controller 22 allows only a single read command packet to be outstanding in order to simplify the tracking of outstanding read command packets. In other embodiments, central CSR controller 22 may include a tracking mechanism which allows any number of read command packets to be outstanding at any given time.

Figure 3:
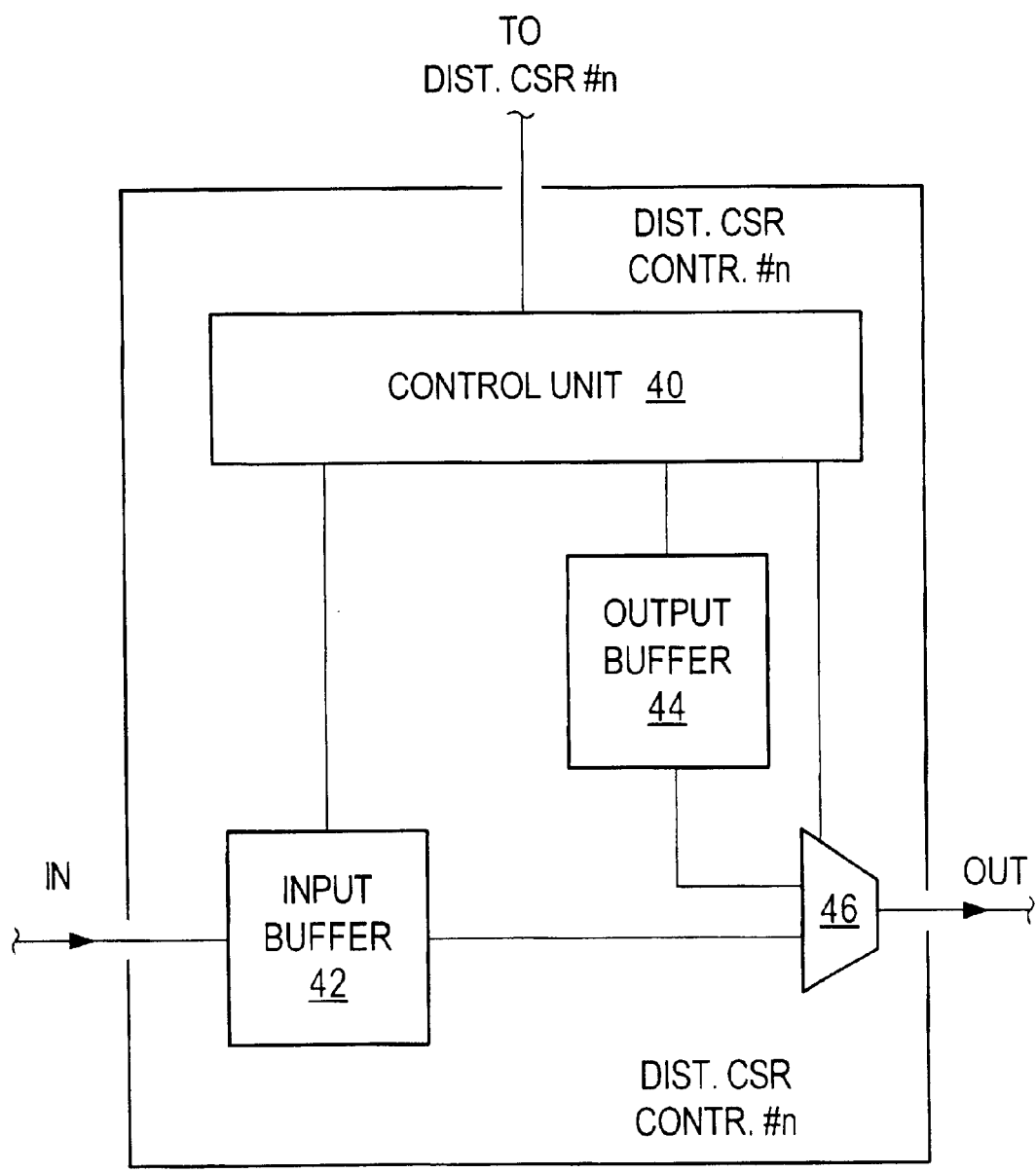
FIG. 3 is a diagram of one embodiment of a representative one of the distributed CSR controllers of FIG. 2.

FIG. 3 is a diagram of one embodiment of a representative one of the distributed CSR controllers of FIG. 2. In the embodiment of FIG. 3, the representative distributed CSR controller (DIST. CSR CONTR. #n) includes a control unit 40 coupled to an input buffer 42, and output buffer 44, and a multiplexer 46. Control unit 40 is also coupled to the corresponding distributed CSRs (DIST. CSRs #n, see FIG. 2). Control unit 40 controls the operations of input buffer 42, output buffer 44, and multiplexer 46. As described above, the input port of the distributed CSR controller is coupled to CSR bus 26. Input buffer 42 receives incoming data from the input port and temporarily stores the incoming data.

Control unit 40 examines incoming data stored within input buffer 42 to determine if the data is destined for the corresponding module (e.g., the corresponding distributed CSRs). Where data is packetized as described above, control unit 40 examines the address payload of the received packet to determine if the address payload includes the module ID of the corresponding module. If the address payload does not include the module ID of the receiving module, the packet is not destined for the module. Control unit 40 forwards the packet to the downstream module by sending a control signal to multiplexer 46 which causes multiplexer 46 to produce the packet from input buffer 42 at an output port. The output port of multiplexer 46 is coupled to the output port of the distributed CSR controller.

If the address payload includes the module ID of the receiving module, the packet is destined for the module. Control unit 40 copies the packet information (e.g., into output buffer 44). Control unit 40 forwards the packet to the downstream module by sending a control signal to multiplexer 46 which causes multiplexer 46 to produce the packet from input buffer 42 at the output port. Control unit 40 may modify the packet information before forwarding the packet to signal receipt of the packet. Control unit 40 performs the command according to the packet type (e.g., command) information of the address payload. If the packet conveys a write command, control unit 40 stores the write data within the corresponding distributed CSRs.

If the packet conveys a read command, control unit 40 retrieves the requested data from the control or status register of the distributed CSRs identified by the address portion of the address payload. Control unit 40 forms a response packet within output buffer 44 containing the read data. In order to aid recognition of the read data by central CSR controller 22, control unit 40 may include the module ID and address information from the original read command packet in the response packet. Control unit 40 adds packet type information to the response packet which indicates the packet contains read data. Control unit 40 calculates a CRC value over the address and data payloads, and includes the CRC value in the response packet. Control unit 40 sends the response packet to central CSR controller 22 (FIG. 2) via the downstream module.

Control unit 40 may send a packet to central CSR controller 22 via the downstream module by waiting for a start of a packet time-slot, and making sure no packet is being received at input port of the distributed CSR controller. Control unit 40 then issues a control signal to multiplexer 46 which causes multiplexer 46 to produce the packet from output buffer 44 at the output port.

When the response packet is received by input buffer 42 after completing a round trip of CSR bus 26, control unit 40 checks the address and data payloads for errors using the CRC value. If the CRC check indicates an error, control unit 40 sends a packet to central CSR controller 22 indicating the error as described above.

As described above, central CSR controller 22 manages CSR error logging and reporting. As shown in Table 3 above, a CSR distribution error packet has an address payload containing the module ID of the reporting module, and the data payload contains a time stamp. The time stamp may be, for example, the value of a free running counter within the distributed CSR controller when the error was detected. Each distributed CSR controller may include a free running counter receiving the same clock signal. All of the free running counters may all be reset by the distributed CSR controllers at the same time. The free running counter value within error packets allows the central CSR controller to determine which distributed CSR controller detected an error first. Such information may help to determine where a fault exists. The width of the free running counters can be up to the maximum size of the data payload. In one embodiment, the width of the free running counters is 16 bits, and the higher-order bits of the free running counter values are sent first.

Numerous variations and modifications will become apparent to those skilled in the art once the above disclosure is fully appreciated. It is intended that the following claims be interpreted to embrace all such variations and modifications.

What is claimed is:

1. An integrated circuit, comprising:
    a plurality of logic modules dispersed about a surface of a semiconductor substrate, wherein each logic module includes:
        a control register configured to store a control value;
        a functional unit coupled to the control register and configured to perform a logic function dependent upon the control value;
    a central controller coupled to each of the logic modules and adapted to receive address, data, and control signals, wherein the central controller is configured to issue a write command to modify the control value stored in a selected one of the control registers dependent upon the address, data, and control signals; and a bus which couples the central controller to each of the logic modules, wherein the bus couples the central controller and each of the logic modules in series forming a communication ring, and wherein the central controller and the logic modules communicate by exchanging data via the communication ring.

2. The integrated circuit as recited in claim 1, wherein the data travels in a single direction around the communication ring.

3. The integrated circuit as recited in claim 1, wherein the central controller and the logic modules communicate according to an established set of communication rules.

4. The integrated circuit as recited in claim 1, wherein the data is included within packets, and wherein the packets also include address information and error checking information.

5. The integrated circuit as recited in claim 4, wherein the address information comprises information identifying a given packet as conveying a write command and information identifying the selected one of the control registers.

6. The integrated circuit as recited in claim 4, wherein the error checking information comprises a cyclic redundancy check (CRC) value.

7. An integrated circuit, comprising:
a plurality of logic modules dispersed about a surface of a semiconductor substrate, wherein each logic module includes:
a control register configured to store a control value;
a functional unit coupled to the control register and configured to perform a logic function dependent upon the control value;
a distributed controller coupled to the control register and coupled to receive commands, wherein the distributed controller is configured to access the control register in response to the commands;
a central controller coupled to the distributed controller of each of the logic modules and adapted to receive address, data, and control signals, wherein the central controller is configured to issue a write command to modify the control value stored in a selected one of the control registers dependent upon the address, data, and control signals; and
a bus which couples the central controller to the distributed controller of each of the logic modules, wherein the bus couples the central controller and the distributed controller of each of the logic modules in series forming a communication ring, and wherein the central controller and the distributed controllers communicate by exchanging data via the communication ring.

8. The integrated circuit as recited in claim 7, wherein the data travels in a single direction around the communication ring.

9. The integrated circuit as recited in claim 7, wherein the central controller and the distributed controllers communicate according to an established set of communication rules.

10. The integrated circuit as recited in claim 7, wherein the data is included within packets, and wherein the packets also include address information and error checking information.

11. The integrated circuit as recited in claim 10, wherein the address information comprises information identifying a given packet as conveying a write command and information identifying the selected one of the control registers.

12. The integrated circuit as recited in claim 10, wherein the error checking information comprises a cyclic redundancy check (CRC) value.

13. An integrated circuit, comprising:
a plurality of logic modules dispersed about a surface of a semiconductor substrate, wherein each logic module includes:
a control register configured to store a control value;
a functional unit coupled to the control register and configured to perform a logic function dependent upon the control value;
a distributed controller coupled to the control register and coupled to receive commands, wherein the distributed controller is configured to access the control register in response to the commands;
a central controller adapted to receive address, data, and control signals;
a single bus coupling the central controller and the distributed controller of each of the logic modules in series forming a communication ring;
wherein the central controller is configured to:
generate a write command to modify the control value stored in a selected one of the control registers dependent upon the address, data, and control signals; and
issue the write command via the bus.

14. The integrated circuit as recited in claim 13, wherein central controller and the distributed controllers communicate by exchanging data via the communication ring.

15. The integrated circuit as recited in claim 14, wherein the data travels in a single direction around the communication ring.

16. The integrated circuit as recited in claim 14, wherein the central controller and the distributed controllers communicate according to an established set of communication rules.

17. The integrated circuit as recited in claim 14, wherein the data is included within packets, and wherein the packets also include address information and error checking information.

18. The integrated circuit as recited in claim 17, wherein the address information comprises information identifying a given packet as conveying a write command and information identifying the selected one of the control registers.

19. The integrated circuit as recited in claim 18, wherein the error checking information comprises a cyclic redundancy check (CRC) value.

20. An integrated circuit, comprising:
a plurality of logic modules dispersed about a surface of a semiconductor substrate, wherein each logic module includes:
a functional unit generating a status value during operation, wherein the status value reflects a status of the functional unit;
a status register coupled to the functional unit and configured to store the status value;
a central controller coupled to each of the logic modules and adapted to receive address, data, and control signals, wherein the central controller is configured to issue a read command to obtain the status value stored in a selected one of the status registers dependent upon the address, data, and control signals; and
a bus which couples the central controller to each of the logic modules, wherein the bus couples the central controller and each of the logic modules in series forming a communication ring, and wherein the central controller and the logic modules communicate by exchanging data via the communication ring.

21. The integrated circuit as recited in claim 20, wherein the data travels in a single direction around the communication ring.

22. The integrated circuit as recited in claim 20, wherein the central controller and the logic modules communicate according to an established set of communication rules.

23. The integrated circuit as recited in claim 20, wherein the data is included within packets, and wherein the packets also include address information and error checking information.

24. The integrated circuit as recited in claim 23, wherein the address information comprises information identifying a given packet as conveying a read command and information identifying the selected one of the status registers.

25. The integrated circuit as recited in claim 23, wherein the error checking information comprises a cyclic redundancy check (CRC) value.

* * * * *